United States Patent
Hu et al.

(10) Patent No.: US 9,831,625 B2
(45) Date of Patent: Nov. 28, 2017

(54) MOTOR GENERATOR

(71) Applicant: National Chiao Tung University, Hsinchu (TW)

(72) Inventors: Jwu-Sheng Hu, Hsinchu (TW); Te-Yang Shen, Hsinchu County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 706 days.

(21) Appl. No.: 14/448,576

(22) Filed: Jul. 31, 2014

(65) Prior Publication Data
US 2015/0194867 A1     Jul. 9, 2015

(30) Foreign Application Priority Data

Jan. 3, 2014    (TW) .............................. 103100224 A

(51) Int. Cl.
| | |
|---|---|
| H02K 13/04 | (2006.01) |
| H02K 13/10 | (2006.01) |
| H02K 13/14 | (2006.01) |
| H02K 39/00 | (2006.01) |
| H02K 19/22 | (2006.01) |
| H01R 39/26 | (2006.01) |

(Continued)

(52) U.S. Cl.
CPC ............ *H01R 39/26* (2013.01); *H02K 5/141* (2013.01); *H02K 5/163* (2013.01); *H02K 11/33* (2016.01); *H02K 13/00* (2013.01); *H02K 13/006* (2013.01); *H02K 13/10* (2013.01); *H02K 13/14* (2013.01); *H02K 19/10* (2013.01); *H02K 19/22* (2013.01); *H02K 2211/03* (2013.01)

(58) Field of Classification Search
CPC ............ H02K 1/182; H02K 1/22; H02K 1/26; H02K 1/2713; H02K 1/2793; H02K 5/16; H02K 13/00; H02K 11/33; H02K 37/08; H02K 37/125; H02K 5/14; H02K 5/143; H02K 5/145; H02K 13/006; H02K 13/04; H02K 13/14
USPC .... 310/49.32, 49.42, 156.32, 268, 127, 128, 310/135, 219, 233, 237, 238, 239, 246
See application file for complete search history.

(56) References Cited

U.S. PATENT DOCUMENTS

| | | | | |
|---|---|---|---|---|
| 4,633,149 A | * | 12/1986 | Welterlin | ................. H02K 5/08 310/68 R |
| 4,959,578 A | * | 9/1990 | Varga | ....................... H02K 1/12 310/114 |

(Continued)

*Primary Examiner* — John K Kim
*Assistant Examiner* — Minki Chang
(74) *Attorney, Agent, or Firm* — Bacon & Thomas, PLLC

(57) ABSTRACT

The present invention provides a motor generator, and the motor generator comprises a permeability structure, a bearing, a hollow rotating shaft, a ringed clip and a rotatable guiding structure. The permeability structure comprises a primary permeability unit and a secondary permeability unit wherein the second permeability unit is stacked with the first permeability unit along an axial air-gap to form a symmetrical structure having a hollow shaft. The bearing is disposed inside the hollow shaft of the permeability structure. The hollow rotating shaft is passed through the hollow shaft of the permeability structure and disposed at another side of the bearing with respect to the permeability structure. The ringed clip is used for fixing the bearing and the hollow rotating shaft. The rotatable guiding structure is disposed inside the hollow rotating shaft for providing power source and transmitting signals.

5 Claims, 6 Drawing Sheets

(51) Int. Cl.
*H02K 13/00* (2006.01)
*H02K 5/14* (2006.01)
*H02K 5/16* (2006.01)
*H02K 19/10* (2006.01)
*H02K 11/33* (2016.01)

(56) References Cited

U.S. PATENT DOCUMENTS

| | | | | |
|---|---|---|---|---|
| 5,646,467 | A * | 7/1997 | Floresta | H02K 1/17 310/154.05 |
| 2006/0022548 | A1* | 2/2006 | Kim | G11B 5/52 310/208 |
| 2010/0295422 | A1* | 11/2010 | Sohn | H02K 21/22 310/68 D |
| 2013/0009508 | A1* | 1/2013 | Takamatsu | H02K 1/02 310/156.35 |
| 2014/0210320 | A1* | 7/2014 | Wirsch, Jr. | H02K 11/04 310/68 D |
| 2015/0091405 | A1* | 4/2015 | Sakamoto | H02K 1/2793 310/156.37 |
| 2016/0013707 | A1* | 1/2016 | Chitsaz | H02K 11/042 310/68 D |

* cited by examiner

MOTOR GENERATOR

BACKGROUND OF THE INVENTION

1. Field of the Invention

The present invention relates to a motor generator, particularly to a motor generator without permanent magnet but with disc type axial air-gap structure.

2. Description of the Prior Art

Generally speaking, in order to obtain the motor generator with high power intensity and high torque intensity, the permanent magnet is used as the rotor magnetic force source for the technology. And in order to improve the power intensity and torque intensity, it is necessary to use strong magnet as the permanent magnet, in order to obtain stronger magnetic force. The rare earth metals are used as raw materials to make strong magnet. However, because the rare earth raw materials are exhausted day by day in recent years, therefore their price is higher and higher, which has exceeded the cost burdened by general motor gradually. Thus, the technical development of the motor generator transfers to magnet free motor generator instead of permanent magnet as the magnetic force source in recent years, such as variable reluctance motor, induction motor etc. However, the power intensity and torque intensity of this kind of magnet free motor generator are relatively low, which will be unfavorable to the application field of directly driven.

When the strong magnet is adopted as the magnetic force source for the rotor of motor generator, although the power intensity and torque intensity can be increased, yet the magnetic effect of permanent magnet will be lost because the temperature rises, which will cause the reduction of motor efficiency for a long period. In addition, the magnetic conductive rate of permanent magnet is extremely low, thus the thicker magnet will have larger magnetic resistance. Therefore, the permanent magnet design is hard to be adopted for several hundred kW industrial motor generator.

Therefore, it is necessary to design a direct driven motor generator without permanent magnet and reducer, to provide large torque output, and improve the drawback of variable reluctance structure.

SUMMARY OF THE INVENTION

The present invention provides a motor generator (or called power generator), and the motor generator comprises a permeability structure, a bearing, a hollow rotating shaft, a ringed clip and a rotatable guiding structure. The permeability structure comprises a primary permeability unit and a secondary permeability unit wherein the second permeability unit is stacked with the first permeability unit along an axial air-gap to form a symmetrical structure having a hollow shaft. The bearing is disposed inside the hollow shaft of the permeability structure. The hollow rotating shaft is passed through the hollow shaft of the permeability structure and disposed at another side of the bearing with respect to the permeability structure. The ringed clip is used for fixing the bearing and the hollow rotating shaft. The rotatable guiding structure is disposed inside the hollow rotating shaft for providing power source and transmitting signals.

In an embodiment of the present invention, wherein the primary permeability unit and the secondary permeability unit comprise: a base, a steel core fixed on the base, a conductive coil surrounded on the steel core, and a power and signal cord.

In an embodiment of the present invention, wherein the motor generator (or power generator) provided by the present invention further comprises: two circuit boards are respectively disposed on two surfaces of the permeability structure, and electrically connected to the conductive coil through the power and signal cord.

In an embodiment of the present invention, wherein the material of base may be pure iron, low carbon steel, silicon steel or sintered ferric powder, casted ferric powder.

In an embodiment of the present invention, wherein the rotatable guiding structure comprises a conductive twisted cord, a brush structure, a slip contact ring or a rotating transformer. The abovementioned brush structure comprises a circuit board, an inner brush seat, an outer brush seat, an inner brush column, an outer brush ring, a brush guiding seat, an inner spring, an outer spring, an inner conductive layer and an outer conductive layer. Wherein, the inner brush column can be socketed into the inner brush seat for conductive contact, and the outer brush ring can be socketed into the outer brush seat for conductive contact. In addition, the inner spring and the outer spring can be inserted into the brush guiding seat for the inner spring to provide the axial pressure to the inner brush seat, so that the inner brush column can closely contact with the inner conductive layer for conduction. The outer spring can provide the axial pressure to the outer brush seat, so that the outer brush ring can closely contact with the outer conductive layer for conduction.

From the following description, it is able to further understand the features and advantages of the present invention. The following figures are a part of the present invention, so please refer to FIG. 1 to FIG. 4 upon reading the text of the present invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The attached figures should be used to describe the implement way of the present invention. In the figures, the same element symbol is used to represent the same element. In order to describe the element more clearly, its size or thickness might be scaled.

Figure 1:
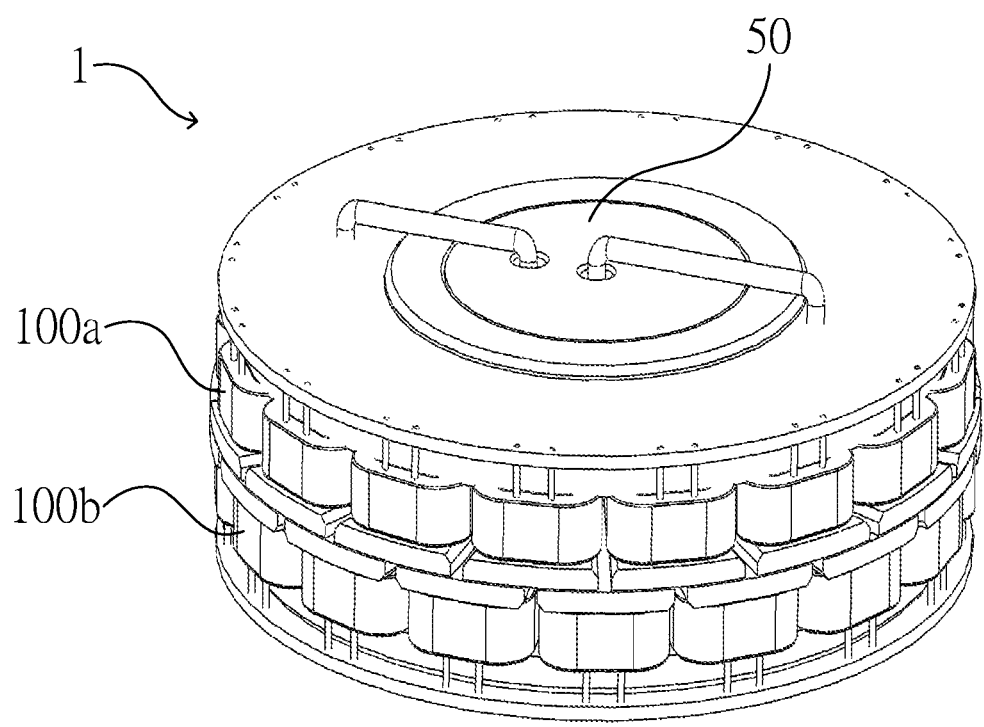
FIG. 1 illustrates the stereo diagram of the motor generator according to an embodiment of the present invention.

Please refer to FIG. 1. FIG. 1 illustrates the stereo diagram of the motor generator according to an embodiment of the present invention. The motor generator 1 comprises a permeability structure 100, which is composed a primary permeability unit 100a and a secondary permeability unit 100b stacked together. The stator, rotor discs are the coiled structures, which are disposed along an axial air-gap to form a symmetrical structure of rotatable motor generator. The rotatable guiding structure is disposed inside the hollow shaft 50, so that the stator and rotor can become the up and bottom electric magnets to switch the current synchronously, and convert it into the mechanical torque output for providing an axial air-gap disc type motor generator having a symmetrical hollow shaft 50.

Figure 2A:
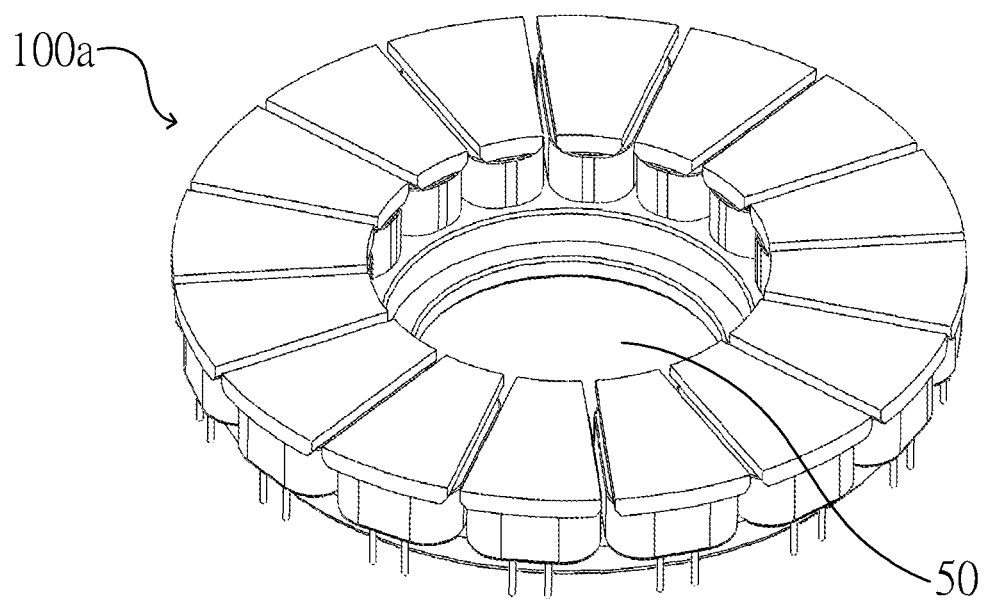
FIG. 2A illustrates the bottom view of the primary permeability unit according to an embodiment of the present invention.
Figure 2B:
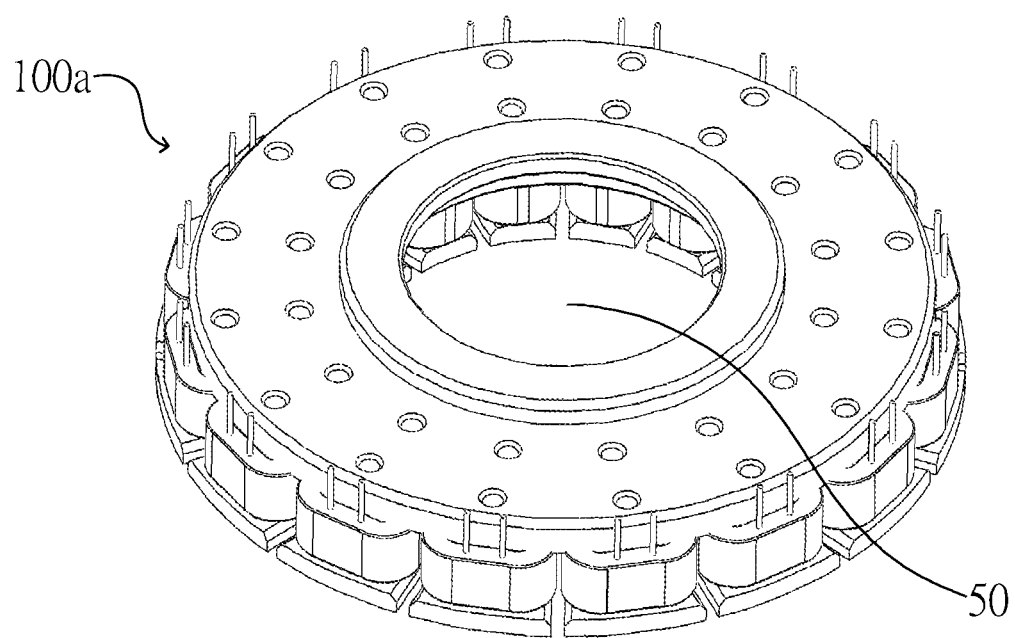
FIG. 2B illustrates the top view of the primary permeability unit according to an embodiment of the present invention.
Figure 2C:
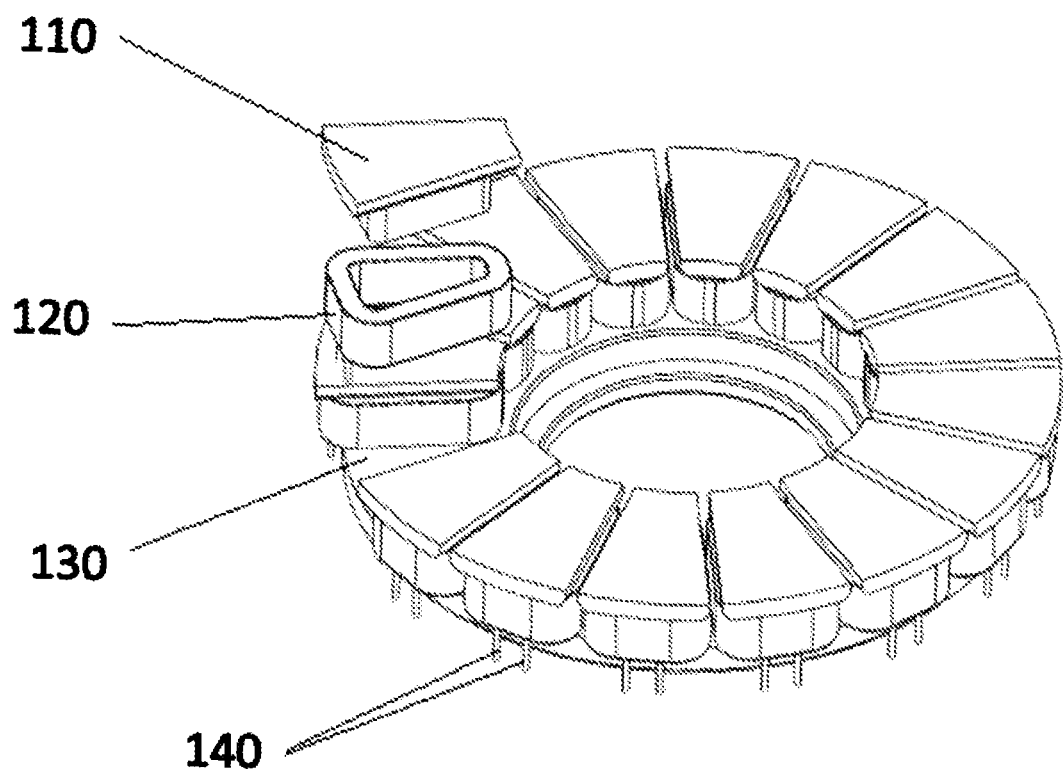
FIG. 2C illustrates the exploded diagram of the primary permeability unit according to an embodiment of the present invention.

Please refer to FIG. 2A, FIG. 2B and FIG. 2C. FIG. 2A illustrates the bottom view of the primary permeability unit according to an embodiment of the present invention. FIG. 2B illustrates the top view of the primary permeability unit according to an embodiment of the present invention. FIG. 2C illustrates the exploded diagram of the primary permeability unit according to an embodiment of the present invention. It is noted that the primary permeability unit 100a is used as the example to describe FIG. 2A to FIG. 2C. The secondary permeability unit 100b has the same structure, thus it will not be described here again. In FIG. 2C, the primary permeability unit 100a at least comprises a base 110, a steel core 120 fixed above the base 110, a conductive coil 130 socketed around the steel core 120, and a power and signal cord 140. In a preferred embodiment, the material of base 100 may be pure iron, low carbon steel, silicon steel or sintered ferric powder, casted ferric powder. The steel core 120 can fixed, riveted, adhered, or welded on the base 110 in ring-shaped arrangement with the same material of screw of base 110. The conductive coil 130 is the fan-shaped structure formed around the steel core 120.

Figure 3:
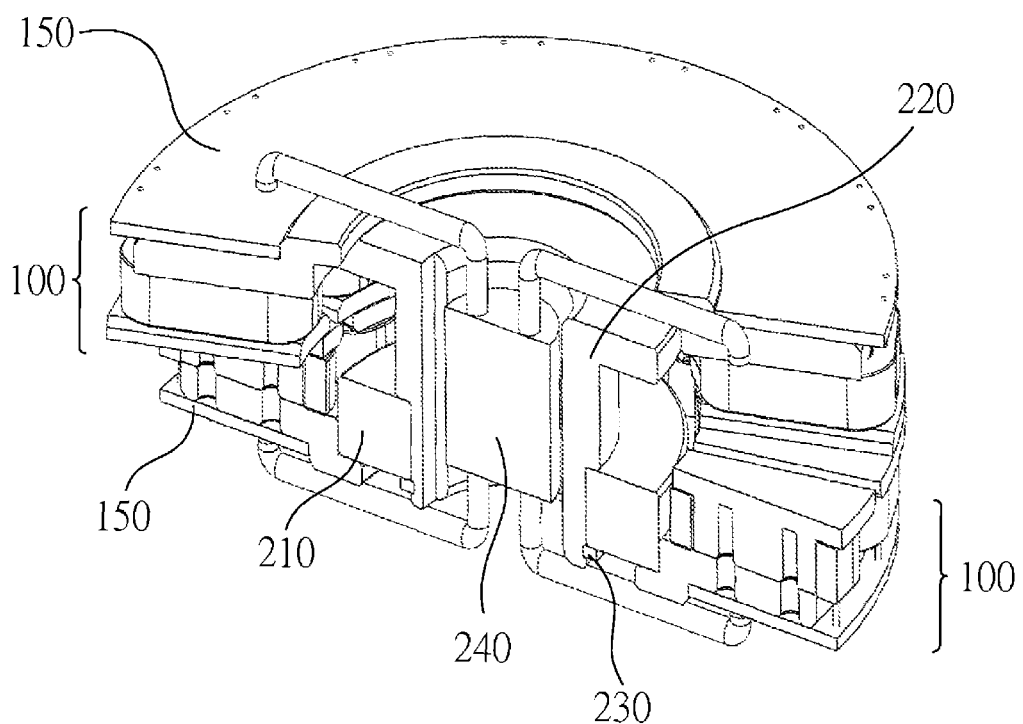
FIG. 3 illustrates the cross-sectional diagram of the motor generator according to an embodiment of the present invention.

Please refer to FIG. 3. FIG. 3 illustrates the cross-sectional diagram of the motor generator according to an embodiment of the present invention. The motor generator 1 adopts the abovementioned primary permeability unit 100a and secondary permeability unit 100b to be stacked along the axial air-gap to form a symmetrical structure of rotatable motor generator. In addition, the motor generator 1 further comprises a bearing 210, a hollow rotating shaft 220, a ringed clip 230, a rotatable guiding structure 240 and two circuit boards 150.

In FIG. 3, the bearing 210 is disposed inside the hollow shaft 50 of the permeability structure 100, in order to bear the axial and radial loading force. The hollow rotating shaft 220 is passed through the hollow shaft 50 of the permeability structure 100 and screwed, riveted, adhered, or welded at another side of the bearing 210 with respect to the permeability structure 100. The ringed clip 230 is used for fixing the bearing 210 and the hollow rotating shaft 220. Finally, the rotatable guiding structure 240 is disposed inside the hollow rotating shaft for providing power source and transmitting signals between the permeability structure 100 and the hollow shaft 50.

Preferably, the conductive twisted cord, the brush structure, the slip contact ring or rotating transformer can be inserted inside the rotatable guiding structure 40. The primary permeability unit 100a and the secondary permeability unit 100b can be connected through the abovementioned structure.

The abovementioned two circuit boards 150 are respectively disposed at both sides of the permeability structure 100, which are connected to the conductive coil 130 through the power and signal cord 140. The driving circuit layout and the power supply circuit layout are designed on these two circuit boards 150.

Figure 4:
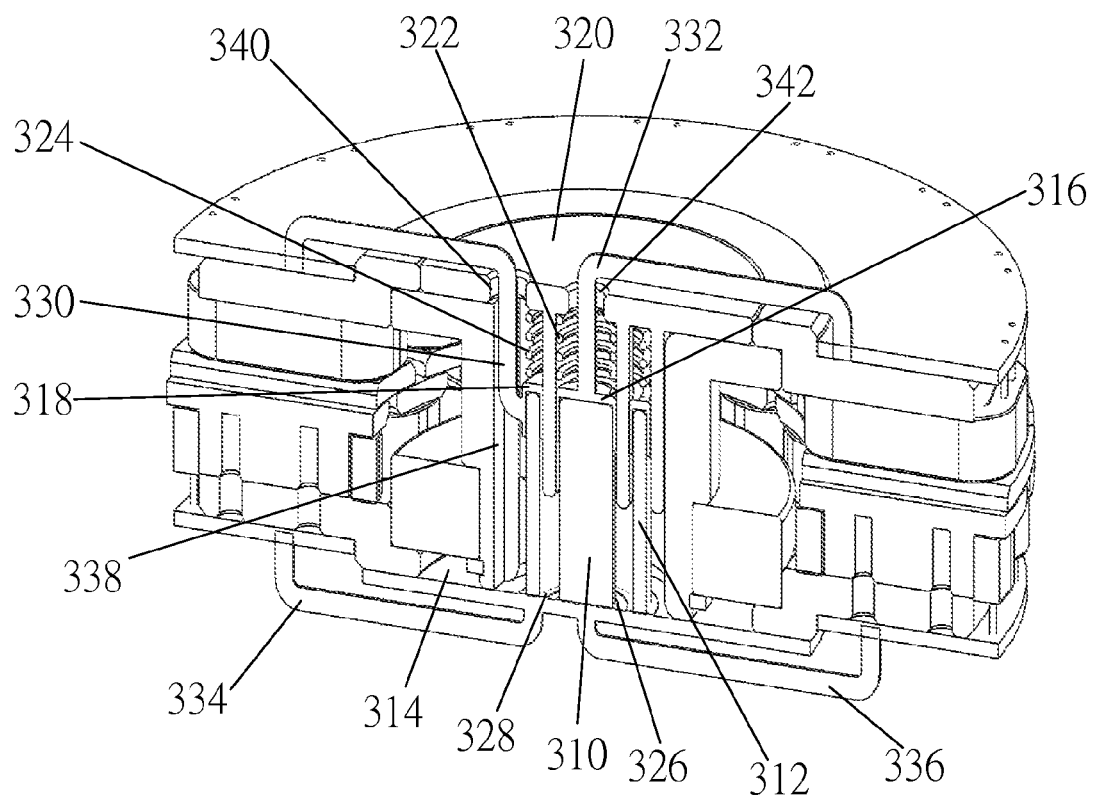
FIG. 4 illustrates the cross-sectional diagram of the rotatable guiding structure according to an embodiment of the present invention.

Please refer to FIG. 4. FIG. 4 illustrates the cross-sectional diagram of the rotatable guiding structure according to an embodiment of the present invention. This embodiment provides a rotatable brush structure for providing power source and transmitting signals among the hollow shaft of the motor generator. As shown in FIG. 4, the brush structure 300 comprises an inner brush column 310, an outer brush ring 312, a circuit board 314, an inner brush seat 316, an outer brush seat 318, a brush guiding seat 320, an inner spring 322, an outer spring 324, an inner conductive layer 326, an outer conductive layer 328, conductive wire 330, 332, 334, 336, a groove 338, and hole 340, 342.

In FIG. 4, the inner brush column 310 and the outer brush ring 312 are made up of the conductive material, such as the graphite, copper, or nickel alloy. The circuit board 314 is made up of the non-conductive material, such as the plastics. The inner conductive layer 326 and the outer conductive layer 328 are electroplated, adhered or printed on the circuit board 314 for contacting with the brush. The inner conductive layer 326 contacts with the inner brush column 310 directly, which can connect to the 150 through the conductive wire 336. The outer conductive layer 328 contacts with the outer brush ring 312 directly, which can connect to the 150 through the conductive wire 334.

The inner brush seat 316 and the outer brush seat 318 are made up of the conductive material, such as the copper alloy, nickel alloy etc. The inner brush column 310 can be socketed into the inner brush seat 316 for conductive contact, and the outer brush ring 312 can be socketed into the outer brush seat 318 for conductive contact. The brush guiding seat 320 is made up of non-conductive material, which is used as the brush guiding seat of the shaft. The inner spring 322 and the outer spring 324 are inserted into the brush guiding seat 320. The inner spring 322 can provide the axial pressure to the inner brush seat 316, so that the inner brush column 310 can closely contact with the inner conductive layer 326 for conduction. The outer spring 324 can provide the axial pressure to the outer brush seat 318, so that the outer brush ring 312 can closely contact with the outer conductive layer 328 for conduction. The conductive wire 330 is used to connect the outer brush seat 318 and the circuit board 150, in order to transmit the electric energy through the groove 338 of hollow rotating shaft 220 and the hole 340 of brush guiding seat 320, and avoid the interference caused by the squeeze of outer spring 324. The conductive wire 332 is used to connect the inner brush seat 316 and the circuit board 150, in order to transmit the electric energy through the hole 342 of brush guiding seat 320, and avoid the interference caused by the squeeze of outer spring 324.

From the structure of abovementioned embodiment, it is known that the present invention does not adopt the permanent magnet. The double-layer coiling structure and single air-gap face are used. The air-gap face locates at the axial direction, thus there is larger air-gap area and lower magnetic resistance. The double-layer coiling structure does not have the permanent magnet structure. The permeability and coiling structure is simpler. At the same volume and weight, the magnetic flux intensity can be increased to several folds. The stator and rotor of the present invention are the coiled structure, which can become the up and bottom electric magnets to switch the current synchronously, and convert it into the mechanical torque output. Thus, the power intensity and torque intensity will be higher at the same volume and space.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A motor generator without a permanent magnet but with a disc type axial air-gap structure, comprising:
    a permeability structure, comprising:
        a primary permeability unit; and
        a secondary permeability unit, wherein said second permeability unit is stacked with said first permeability unit along an axial air-gap to form a symmetrical structure having a hollow shaft;
    a bearing, said bearing is disposed inside said hollow shaft of said permeability structure;
    a hollow rotating shaft, said hollow rotating shaft is passed through said hollow shaft of said permeability structure and disposed at another side of said bearing with respect to said permeability structure;
    a ringed clip, said ringed clip is used for fixing said bearing and said hollow rotating shaft; and
    a rotatable guiding structure being a rotatable brush structure, said rotatable guiding structure is disposed inside said hollow rotating shaft for providing power source and transmitting signals, said rotatable brush structure comprising:
        a circuit board;
        an inner brush seat;
        an outer brush seat;
        an inner brush column, said inner brush column is socketed into said inner brush seat for conductive contact;
        an outer brush ring, said outer brush ring is socketed into said outer brush seat for conductive contact;
        a brush guiding seat;
        an inner spring;
        an outer spring;
        an inner conductive layer; and
        an outer conductive layer, wherein said inner spring and said outer spring is inserted into said brush guiding seat for said inner spring to provide an axial pressure to said inner brush seat, so that said inner brush column is closely contacted with said inner conductive layer for conduction, said outer spring provides said axial pressure to said outer brush seat, so that said outer brush ring is closely contacted with said outer conductive layer for conduction.

2. The motor generator according to claim 1, wherein said primary permeability unit and said secondary permeability unit comprise:
    a base;
    a steel core fixed on said base;
    a conductive coil surrounded on said steel core, and
    a power and a signal cord.

3. The motor generator according to claim 1, further comprising:
    two circuit boards are respectively disposed on two surfaces of said permeability structure, and electrically connected to said conductive coil through said power and said signal cord.

4. The motor generator according to claim 1, wherein a material of said base is selected from the group consisting of pure iron, low carbon steel, silicon steel, sintered ferric powder, and casted ferric powder.

5. The motor generator according to claim 1, wherein said rotatable guiding structure further comprises a conductive twisted cord, and a slip contact ring.

* * * * *